No. 609,480. Patented Aug. 23, 1898.
W. S. TRUEX.
ODORLESS COOKING UTENSIL.
(Application filed Oct. 26, 1897.)

(No Model.)

Witnesses

Inventor
William S. Truex
by Geo. H. Holgate
Attorney

UNITED STATES PATENT OFFICE.

WILLIAM S. TRUEX, OF TRENTON, NEW JERSEY.

ODORLESS COOKING UTENSIL.

SPECIFICATION forming part of Letters Patent No. 609,480, dated August 23, 1898.

Application filed October 26, 1897. Serial No. 656,402. (No model.)

*To all whom it may concern:*

Be it known that I, WILLIAM S. TRUEX, a citizen of the United States, residing at Trenton, in the county of Mercer and State of New Jersey, have invented a certain new and useful Improvement in Odorless Cooking Utensils, of which the following is a specification.

My invention relates to a new and useful improvement in odorless cooking vessels, and has for one object to so construct devices of this description as to provide for the carrying away of vapors arising from the contents thereof and conveying them to the fire-flue or chimney, thus preventing their access to the room and avoiding the contamination of the atmosphere thereof; and a further object of my invention is to provide a convenient means for stirring and agitating the contents of the vessel without uncovering the same.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
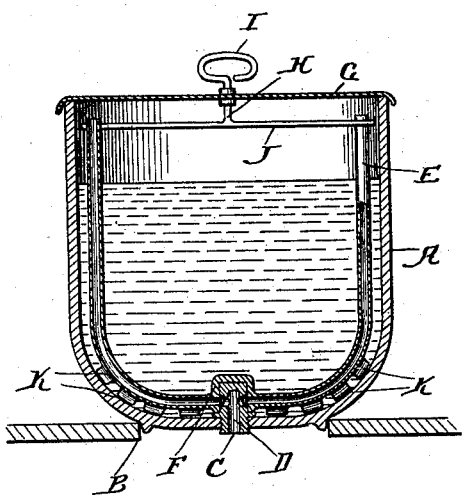
Figure 2:
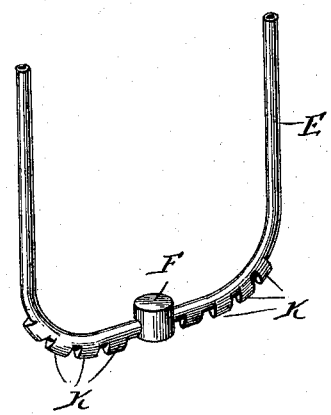

Figure 1 is a vertical section of a cooking utensil made in accordance with my improvement, showing the agitators and conveyers in proper position therein; and Fig. 2, a detail perspective of the agitators and conveyers when removed from the vessel.

In carrying out my invention A represents a cooking vessel, which may be of any desired shape or size adapted to fit upon the open eye B of the stove or range, and in the bottom of this vessel is secured a nipple C, the upper portion of which is tapered upon the exterior after the manner of a plug-valve for the purpose hereinafter set forth, and through this nipple is a passage-way D, communicating with the interior of the vessel and the exterior thereof.

E represents the odor-conveyer, which consists of two or more tubes bent into U shape, as clearly shown, and secured to or formed with these tubes is a central hub F, having a socket therein adapted to fit upon the tapered portion of the nipple, thus making a sealed joint which, while preventing the outflow of the contents of the vessel, will permit the odor-conveyers to be revolved upon this joint as an axis, and, if desired, any suitable means, such as a union-collar, may be used to permanently secure the hub in place, so as to prevent its accidental displacement; but for ordinary purposes the tapered joint will be sufficient to accomplish the desired results without otherwise securing the parts together, and this has the advantage of permitting the ready removal of the conveyers when it is desired to clean the same or the vessel.

G represents a cover adapted to fit over the mouth of the vessel and close the same, and through the center of this cover is passed a short rod H, having a handle I for its manipulation, while its inner end is secured to the yoke-bar J, which extends to the upper ends of the odor-conveyer tubes, as clearly shown in Fig. 1. The result of this is that when the cover of the vessel is placed thereon this yoke-bar is brought into engagement with the odor-conveyer tubes, so that thereafter said odor-conveyer may be revolved by the proper manipulation of the handle I, and, as is obvious, this revolving of the odor-conveyer will stir or agitate the contents of the vessel, thus avoiding the necessity of having to remove the cover for that purpose.

To further facilitate the perfect agitation of the contents of the vessel, a series of projections K are formed with or attached to the odor-conveyer tubes, at the lower portions thereof, and extend within close proximity to the wheels of the vessel, so that when the odor-conveyer is revolved these projections will act as stirrers.

From this description it will be seen that when the vessel is placed upon the open eye of the stove and the heat therefrom starts the process of cooking the vapors arising from the contents of the vessel will pass downward through the odor-tubes, as indicated by the arrows, and through the passage D to the fire and from thence to the flue or chimney, so that no odor or other disagreeable quality of the vapors arising within the vessel is transmitted to the room, thus permitting cooking to take place without the usual disagreeable results attendant thereon.

One of the principal advantages of my improvement is its exceeding simplicity and the fact that the odor-conveyer serves also as an agitator, and the further fact that this odor-conveyer may be readily removed from the vessel, thereby permitting the thorough cleaning of both the vessel and the conveyer.

The cost of manufacture of devices in accordance with my improvement is but little in advance of the cost of ordinary cooking vessels, since the only additions thereto are the nipple and odor-conveyer, and these are inexpensive elements.

Having thus fully described my invention, what I claim as new and useful is—

1. In combination with a vessel of the character described, an odor-conveyer and agitator consisting of a hub adapted to form a joint with a hollow nipple carried by the vessel, tubes bent in U shape leading from the hub above the normal level of the contents of the vessel, said tubes communicating with the passage in the nipple, and means for agitating the conveyer, as and for the purpose set forth.

2. The herein-described combination of a vessel, a nipple secured in the bottom thereof having a passage-way therethrough, a hub having a socket adapted to fit over the tapered end of the nipple, odor-conveyer tubes connected to the hub and extending upward above the normal level of the contents of the vessel, said tubes communicating with the passage in the nipple, a cover, and means journaled within said cover for revolving the odor-conveyer, as specified.

3. The herein-described combination of a cooking vessel, a nipple secured in the bottom thereof having a passage therethrough and a tapered end, a hub having a socket therein adapted to fit over the tapered end of the nipple, odor-conveyer tubes connected with the hub and extending upward in U shape, above the normal level of the contents of the vessel, said tubes communicating with the passage in the nipple, a yoke-bar adapted to engage the upper ends of the tubes, a rod extending upward from the bar, a cover in which said rod is journaled, and a handle formed upon the upper end of the rod whereby the odor-conveyer may be revolved when the cover is in place, as specified.

In testimony whereof I have hereunto affixed my signature in the presence of two subscribing witnesses.

WILLIAM S. TRUEX.

Witnesses:
S. S. WILLIAMSON,
SAMUEL L. TAYLOR.